United States Patent
Hua et al.

(10) Patent No.: US 11,829,269 B2
(45) Date of Patent: Nov. 28, 2023

(54) STORAGE ARRAY DISK RECOVERY

(71) Applicant: EMC IP Holding Company LLC, Hopkinton, MA (US)

(72) Inventors: Kuolin Hua, Natick, MA (US); Kunxiu Gao, Boxborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 114 days.

(21) Appl. No.: 17/160,490

(22) Filed: Jan. 28, 2021

(65) Prior Publication Data
US 2022/0237093 A1     Jul. 28, 2022

(51) Int. Cl.
| | |
|---|---|
| G06F 11/00 | (2006.01) |
| G06F 11/20 | (2006.01) |
| G06F 3/06 | (2006.01) |
| G06F 11/30 | (2006.01) |

(52) U.S. Cl.
CPC ........ G06F 11/2028 (2013.01); G06F 3/0619 (2013.01); G06F 3/0631 (2013.01); G06F 3/0644 (2013.01); G06F 3/0689 (2013.01); G06F 11/3034 (2013.01)

(58) Field of Classification Search
CPC ............ G06F 11/2028; G06F 11/1076; G06F 11/1088
See application file for complete search history.

(56) References Cited

U.S. PATENT DOCUMENTS

| | | | | |
|---|---|---|---|---|
| 5,258,984 A | * | 11/1993 | Menon .................. | G11C 29/88 |
| | | | | 714/6.32 |
| 5,485,571 A | * | 1/1996 | Menon .................. | G11C 29/74 |
| | | | | 714/6.32 |
| 7,085,953 B1 | * | 8/2006 | Hsu ..................... | G06F 11/1076 |
| | | | | 714/E11.034 |
| 2017/0315745 A1 | * | 11/2017 | Agombar ............. | G06F 3/0631 |

\* cited by examiner

*Primary Examiner* — Philip Guyton
(74) *Attorney, Agent, or Firm* — Krishnendu Gupta; Nikhil Patel

(57) ABSTRACT

One or more aspects of the present disclosure relate to recovering at least one failed disk. In embodiments, determining a storage reserve capacity allocated for recovering at least one storage device of a storage array is determined. Zero or more storage portions from each storage device of at least one storage cluster for disk recovery are adaptively assigned based on the storage reserve capacity. The failing and/or failed disk using the assigned storage portions is recovered in response to detecting a failing and/or failed disk.

20 Claims, 6 Drawing Sheets

500

505
determining a storage reserve capacity allocated for recovering at least one failed storage device of a storage array

510
based on storage reserve capacity, reserving portions from each storage device of a storage cluster for disk recovery

515
in response to detecting a failing and/or failed disk, recovering the failing and/or failed disk using the cluster's reserved storage portions

FIG. 5

STORAGE ARRAY DISK RECOVERY

BACKGROUND

Organizations can use a storage array to store their data. A storage array, also called a disk array, is a data storage system for block-based storage, file-based storage, or object storage. Rather than store data on a server, storage arrays use multiple drives in a collection capable of storing a huge amount of data, managed by a central management system. In some situations, one or more of the multiple drives can fail. Such a failure can cause an organization to lose all the data stored on the failed drive. To mitigate such data loss, organizations can use a redundant array of independent disks (RAID) technique to store data.

SUMMARY

One or more aspects of the present disclosure relate to recovering at least one failed disk. In embodiments, determining a storage reserve capacity allocated for recovering at least one storage device of a storage array is determined. Zero or more storage portions from each storage device of at least one storage cluster for disk recovery are adaptively assigned based on the storage reserve capacity. The failing and/or failed disk using the assigned storage portions is recovered in response to detecting a failing and/or failed disk.

In embodiments, the zero or more storage portions can be adaptively assigned by using a successive redistribution and assignment technique.

In embodiments, each storage device can be subdivided into a plurality of partitions. The partitions can be equal-sized. Additionally, at least one redundant array of independent disks (RAID) can be established with a width (W) corresponding to RAID data (D) and parity (P) members. Further, a partition can be established amount based on a multiple of the RAID width.

In embodiments, the at least one storage cluster can be established based on the RAID width and the partitions amount.

In embodiments, at least one storage matrix defined by a number of storage devices and the partitions amount can be established. The number of storage devices can correspond to W+1. Further, the storage cluster can be related to the at least one storage matrix.

In embodiments, a set of storage submatrices can be established within the storage cluster. Each sub-matrix can be defined by the number of storage devices and a partition sub-matrix amount corresponding to the RAID width.

In embodiments, at least one RAID group can be provisioned from zero or more partitions defined by each sub-matrix. The at least one RAID group's storage capacity can correspond to the storage reserve capacity.

In embodiments, each RAID group can be provisioned using an adaptive successive redistribution and assignment technique (adaptive technique). The adaptive technique can include selecting at most one storage device's partition in each storage sub-matrix. Additionally, an amount of RAID groups can be established based on a maximum RAID group capacity and the allocated storage reserve capacity.

In embodiments, a storage cluster amount can be determined. Based on the storage cluster amount, each cluster can be provisioned with an equal amount of RAID groups.

In embodiments, each RAID group's partitions can be exclusively configured for disk recovery.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

FIG. 5 is a flow chart of a method corresponding to a disk recovery in accordance with example embodiments disclosed herein.

DETAILED DESCRIPTION

A storage array, also called a disk array, is a data storage system for block-based storage, file-based storage, or object storage. Rather than store data on a server, storage arrays use multiple drives in a collection capable of storing a huge amount of data, managed by a central management system. In some situations, one or more of the multiple drives can fail. Such a failure can cause an organization to lose all the data stored on the failed drive. To mitigate such data loss, organizations can use a redundant array of independent disks (RAID) technique to store data. RAID techniques organize a storage array's disk drives as members of RAID protection groups. A RAID (D+P) protection group has data members (D) and parity members (P). The data members store data. The parity members store parity information such as XORs of data values. The parity information enables reconstruction of data in the event that a data member fails. Parity information can be reconstructed from the data on the data members in the event that a parity member fails.

Embodiments of the present disclosure partitions disks in a RAID group and adaptively assigns (e.g., establishes) one or more partitions as spares as described in greater detail herein.

Figure 1:
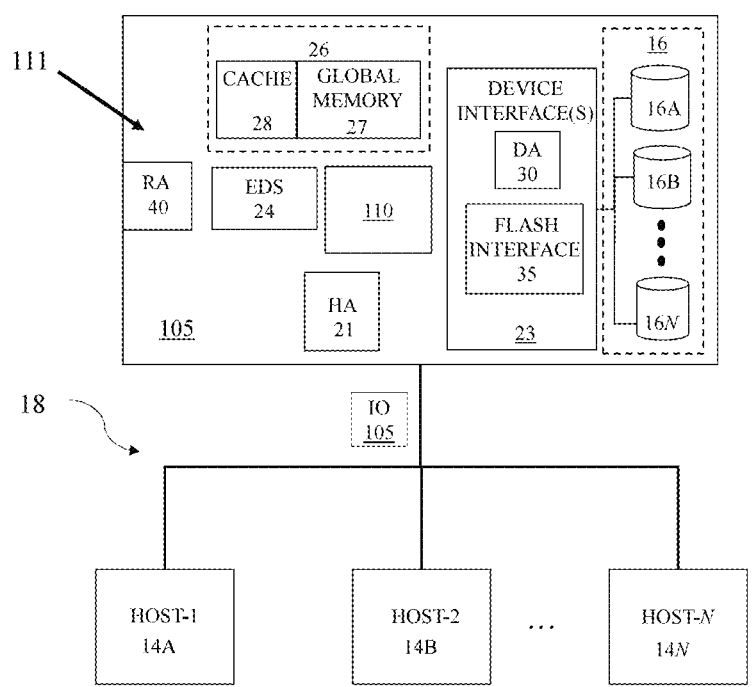
FIG. 1 is a block diagram of a storage system in accordance with example embodiments disclosed herein.

Regarding FIG. 1, an example system 100 includes a local data storage array 105 having one or more components 111 that perform one or more storage operations. The array 105 can communicatively couple to host systems 14*a-n* through communication medium 18. In embodiments, the hosts 14*a-n* can access the data storage array 105, for example, to perform input/output (IO) operations or data requests. The communication medium 18 can be any one or more of a variety of networks or other types of communication connections known to those skilled in the art. In embodiments, the communication medium 18 can be a network connection, bus, and/or other types of data link, such as a hardwire or other connections known in the art. For example, the communication medium 18 can be the Internet, an intranet, network (including a Storage Area Network (SAN)), or other wireless or other hardwired connection(s) by which the hosts 14a-n can access and communicate with the data storage array 105. The hosts 14a-n can also communicate with other components included in the system 100 via the communication medium 18. The communication medium 18 can be a Remote Direct Memory Access (RDMA) fabric that interconnects hosts 14a-n and the array 105 to form a SAN. The RDMA fabric can use a nonvolatile memory express (NVMe) communications protocol to send/receive data to/from the SAN devices.

The hosts 14a-n and the data storage array 105 can be connected to the communication medium 18 by any one of a variety of connections as can be provided and supported per the type of communication medium 18. The hosts 14a-n can include any one of a variety of proprietary or commercially available single or multi-processor systems, such as an Intel-based processor and other similar processors.

The hosts 14a-n and the data storage array 105 can be located at the same physical size or in different physical locations. The communication medium 18 can use various communication protocols such as SCSI, Fibre Channel, iSCSI, NVMe, and the like. Some or all the connections by which the hosts 14a-n and the data storage array 105 can connect to the communication medium can pass through other communication devices, such as switching equipment that can exist such as a phone line, a repeater, a multiplexer, or even a satellite.

Each of the hosts 14a-n can perform different types of data operations in accordance with different types of tasks. In embodiments, any one of the hosts 14a-n can issue a data request (e.g., an input/out (IO) operation) to the data storage array 105. For example, an application executing on one of the hosts 14a-n can perform a read or write operation resulting in one or more data requests to the data storage array 105.

The storage array 105 can also include adapters or directors, such as an HA 21 (host adapter), RA 40 (remote adapter), and/or device interface 23. Each of the adapters, HA 21, RA 40, can be implemented using hardware, including a processor with local memory. The local memory 26 can store code that the processor can execute to perform one or more storage array operations. The HA 21 can manage communications and data operations between one or more of the host systems 14a-n. The local memory 26 can include global memory (GM) 27.

In an embodiment, the HA 21 can be a Fibre Channel Adapter (FA) or another adapter which facilitates host communication. The HA 21 can receive IO operations from the hosts 14a-n. The storage array 105 can also include one or more RAs (e.g., RA 40) that can, for example, facilitate communications between data storage arrays (e.g., between the storage array 12 and the external storage system(s)). The storage array 105 can also include one or more device interfaces 23 for facilitating data transfers to/from the data storage disks 16. The data storage interfaces 23 can include device interface modules, for example, one or more disk adapters (DAs) 30 (e.g., disk controllers), flash drive interface 35, and the like. The DA 30 can interface with the physical data storage disks 16.

In embodiments, the storage array 105 can include one or more internal logical communication paths (e.g., paths 221, 222 of FIG. 2) between the device interfaces 23, the RAs 40, the HAs 21, and the memory 26. The communication paths can include internal busses and/or communication modules. For example, the GM 27 can use the communication paths to transfer data and/or send other communications between the device interfaces 23, HAs 21 and/or RAs 40 in a data storage array. In an embodiment, the device interfaces 23 can perform data operations using a cache that can be included in the GM 27, for example, when communicating with other device interfaces and other components of the data storage array. The local memory 26 can also include additional cache memory 28 can be a user-defined adaptable memory resource.

The host systems 14a-n can issue data and access control information through the SAN 18 to the storage array 105. The storage array 105 can also provide data to the host systems 14a-n via the SAN 18. Rather than presenting address spaces of the disks 16a-n, the storage array 105 can provide the host systems 14a-n with logical representations that can include logical devices or logical volumes (LVs) that represent one or more physical storage addresses of the disk 16. Accordingly, the LVs can correspond to one or more of the disks 16a-n. Further, the array 105 can include an Enginuity Data Services (EDS) processor 24. The EDS 24 can control the storage array components 111. In response to the array receiving one or more real-time IO operations, the EDS 24 applies self-optimizing techniques (e.g., one or more machine learning techniques) to deliver performance, availability and data integrity services.

The storage disk 16 can include one or more data storage types. In embodiments, the data storage types can include one or more hard disk drives (HDDs) and/or one or more solid state drives (SSDs). An SSD is a data storage device that uses solid-state memory to store persistent data. An SSD that includes SRAM or DRAM, rather than flash memory, can also be referred to as a RAM drive. SSD can refer to solid-state electronics devices distinguished from electro-mechanical devices, such as HDDs, having moving parts.

The array 105 can enable multiple hosts to share data stored on one or more of the disks 16a-n. Accordingly, the HA 21 can facilitate communications between a storage array 105 and one or more of the host systems 14a-n. The RA 40 can be configured to facilitate communications between two or more data storage arrays. The DA 30 can be one type of device interface used to enable data transfers to/from the associated disk drive(s) 16a-n and LV(s) residing thereon. A flash device interface 35 can be configured as a device interface for facilitating data transfers to/from flash devices and LV(s) residing thereon. It should be noted that an embodiment can use the same or a different device interface for one or more different types of devices than as described herein.

In embodiments, the array 105 can include a disk controller 110 configured to perform one or more disk recovery operations as described in greater detail herein. The disk controller 110 includes one or more elements (e.g., software and/or hardware elements), e.g., elements 201 of FIG. 2. Although the controller 110 is illustrated as an independent element, one or more of its elements can be established with one or more of the array's components 111 (e.g., the EDS 24 and/or DA 30).

Figure 1A:
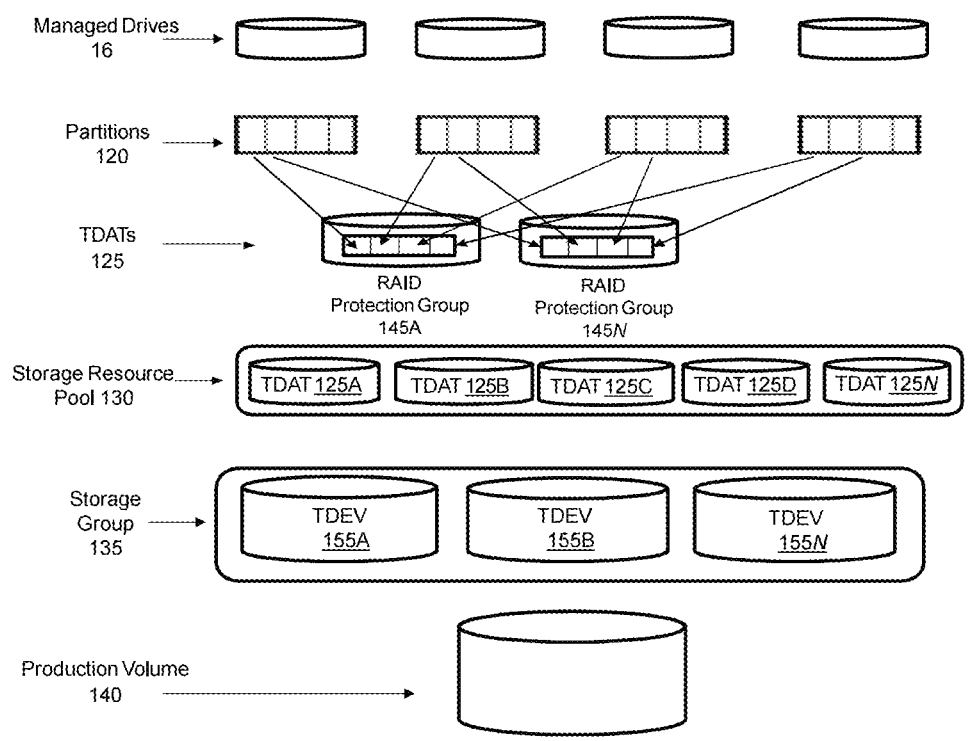
FIG. 1A illustrates layers of abstraction between a storage array's managed drives and a production volume in accordance with example embodiments disclosed herein.

Regarding FIG. 1A, the disk controller 110 can be configured to manage one or more of the drives 16. In embodiments, the disk controller 110 can generate an abstraction between the managed drives 16 and a production volume 140. The controller 110 can process sector unit sizes of each manage drive's storage capacity. Further, the controller 110 can characterize types of the managed drives 16 by different sector sizes (e.g., 2 KB.). The array 105 can receive IOs from the hosts 14A-N that are related to larger allocation units such as tracks. The tracks can be a fixed size, which is a multiple of the sector size. For example, an IO include a read or write operation directed to a track's sectors.

In embodiments, the controller 110 can organize the managed drives 16 into logical partitions 120 (e.g., splits) of equal storage capacity. In embodiments, a selection of split storage capacity can be a design implementation and, for context and without limitation, may be some fraction or percentage of the capacity of a managed drive equal to an integer multiple of sectors greater than 1. Each split can include a contiguous range of logical addresses. The controller 110 can group the splits 120 from one or more of the managed drives 16 to create data devices (TDATs) 125. The controller 100 can further organize each TDAT's splits 120 as members of a protection group, e.g., RAID protection groups 145A-N. A storage resource pool 130, also known as a "data pool" or "thin pool," is a collection of TDATs 125A-N of an emulation and RAID protection type, e.g., RAID-5. In some implementations all TDATs 125A-N in a drive group are of a single RAID protection type and all are the same size (storage capacity). The controller 110 can establish logical thin devices (TDEVs) 155A-N using the TDATs 125A-N. The TDATs 125A-N and TDEVs 155A-N are accessed using tracks as the allocation unit. For context and without limitation, one track may be 128 KB. The controller 110 can also organize one or more TDEVs 155A-N into a storage group 135. Further, the controller 110 can establish the production volume 140 from the storage group 135. The controller 110 and/or the DA 30 can store host application data in blocks on the production volume 140. Further, the controller 110 can map the host application data to tracks of the TDEVs 155A-N. The controller 110 can also map the TDEVs 155A-N to sectors of the managed drives 16. Regardless of the specific allocation unit capacities selected, a track is larger than both the sectors and the fixed size blocks used in communications between the storage array and the hosts to access the production volume.

Figure 2:
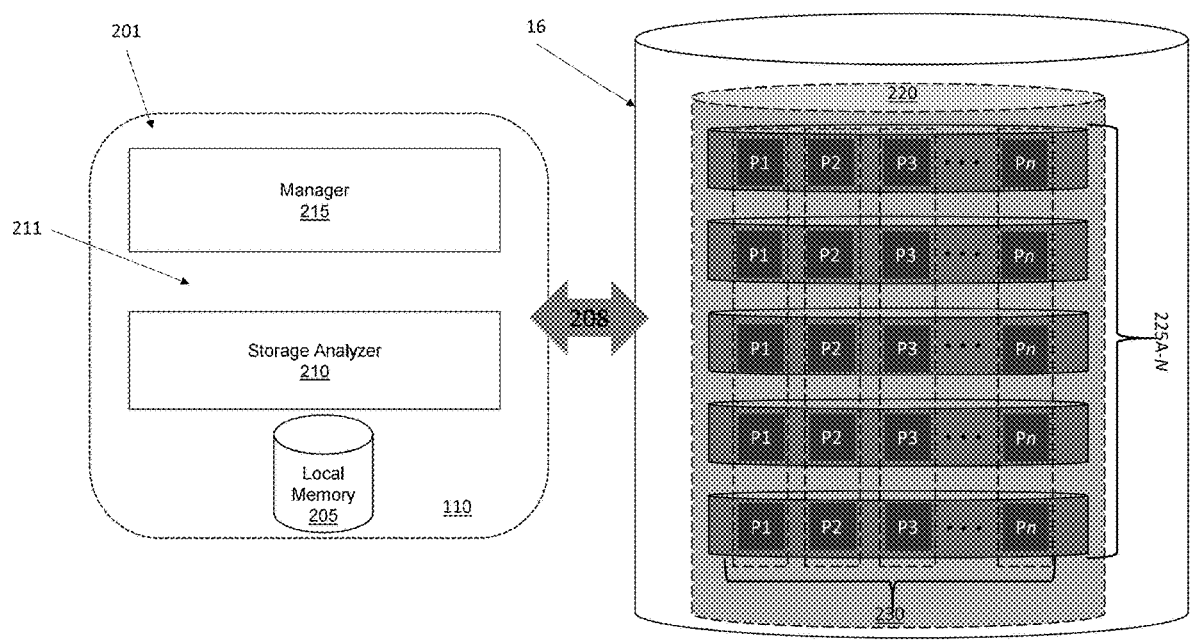
FIG. 2 is a block diagram of a disk recovery engine in accordance with example embodiments disclosed herein.

Regarding FIG. 2, the array 105 includes a storage device controller 110. The controller 110 can include one or more elements (e.g., software and/or hardware elements) 201 configured to perform one or more disk management operations. In embodiments, the controller 110 can include a storage analyzer 210. The analyzer 210 can be communicatively coupled to the storage devices 16 (e.g., via fabric 208). The analyzer 210 can identify one or more storage device parameters. For example, the storage device parameters can include one or more of: a number of storage devices, storage device type, storage capacity, and the like. Further, the analyzer 210 can monitor an operational state of the devices 16. The operational state can correspond to a health of the storage devices 16. In embodiments, the analyzer 210 can determine whether one of the devices 16A-N is about to fail and/or has failed. In response to such a determination, the analyzer 210 can issue a failure signal to a device manager 215 that can perform one or more disk recovery operations.

In embodiments, the device controller 110 can include a manager 215 configured to manage the managed devices 16. For example, the manager 215 can organize the drives 16 into one or more logical clusters (e.g., cluster 220) that includes a set of the managed devices (e.g., devices 225A-N). Further, the manager 215 can organize the managed drives 16 into the logical partitions 120 (e.g., partitions P1–Pn) of equal storage capacity. Further, the manager 215 can assign (e.g., reserve) zero or more of the partitions 120 as spares. In embodiments, the manager 215 can adaptively assign the partitions 120 as spares using a successive redistribution and assignment technique. Further, the manager 215 can establish one or more protection groups 230 (e.g., RAID protection groups 145A-N of FIG. 1A) using the assigned spare partitions. In response to receiving a disk failure signal (e.g., from the analyzer 210), the manager 215 can recover the failing and/or failed disk using the spares.

Figure 3:
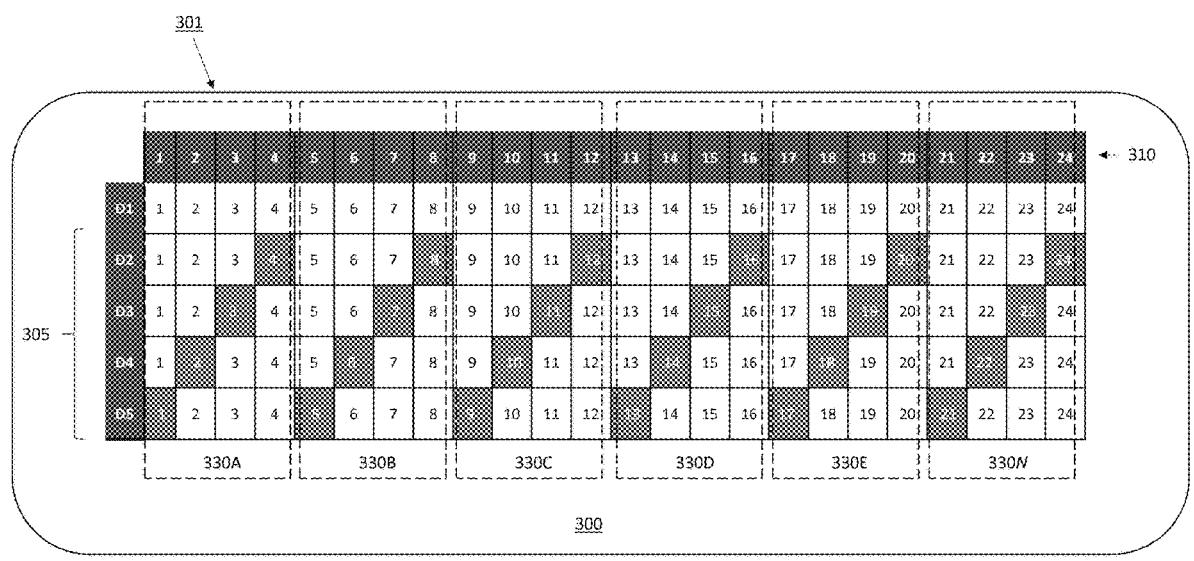
FIG. 3 is a block diagram of a storage matrix in accordance with example embodiments disclosed herein.

Regarding FIG. 3, the device manager 215 can establish a cluster 300 of storage devices D1-D5 from disks 16A-N. For example, the device manager 215 can establish the cluster based on an implemented RAID (D+P) protections group (e.g., protection groups 145A-N of FIG. 1A). Using the RAID (D+P) group's 'D' data members and 'P' parity members, the manager 215 can determine a RAID width (W). In the example illustrated by FIG. 3, the RAID width is four (4). Based on 'W', the manager 215 can establish the cluster 300 to include W+1 disks (e.g., disks D1-D5) selected from the array's storage devices 16A-N. Further, the device manager 215 can subdivide the disks D1-D5 into partitions 310 based on a multiple of 'W'. In this example, the manager 215 subdivides the disks D1-D5 into 24 partitions (e.g., 6*'W', where W=4). Additionally, the device manager 215 can generate a searchable data structure (e.g., matrix 301) that provides a logical representation of the cluster 300. Conceptually, the matrix 301 can represent the cluster's disks D1-D5 as its rows and each disk's partitions 310 as its columns. The manager 215 can store the matrix 301 in its local memory (e.g., memory 205 of FIG. 2).

In embodiments, the manager 215 can provision partitions of the cluster's disks D1-D5 as spares. In examples, the manager 215 can select a subset of the disks 305 (e.g., disk D2-D5) to be provisioned with one or more spare partitions. In other words, the manager 215 allows on of the disks (e.g., disk D1) to remain free from any spare partitions. Further, the manager 215 can establish each RAID group using each disk's partitions in each of the matrix's columns. In embodiments, the manager 215 can subdivide the matrix 301 into logical submatrices 330A-N. For example, the manager 215 can establish each submatrix 330A-N based on a RAID group width 'W'. In the illustrated example, the manager 215 can define each submatrix 330A-N as having W+1 rows and W columns.

In embodiments, the manager 215 can adaptively assign one or more partitions on a per submatrix 330A-N basis. For example, the manager 215 can distribute its spare assignments such that at most one of each disk's partitions defined by each submatrix 330A-N is provisioned as a spare (e.g., the shaded matrix cells shown in FIG. 3). Further, the manager 215 can ensure that each submatrix 330A-N includes matching spare distribution patterns. In response to receiving a disk failure signal, the manager 215 can recover the failed disk using the spare partitions from each submatrix 330A-N.

Figure 4:
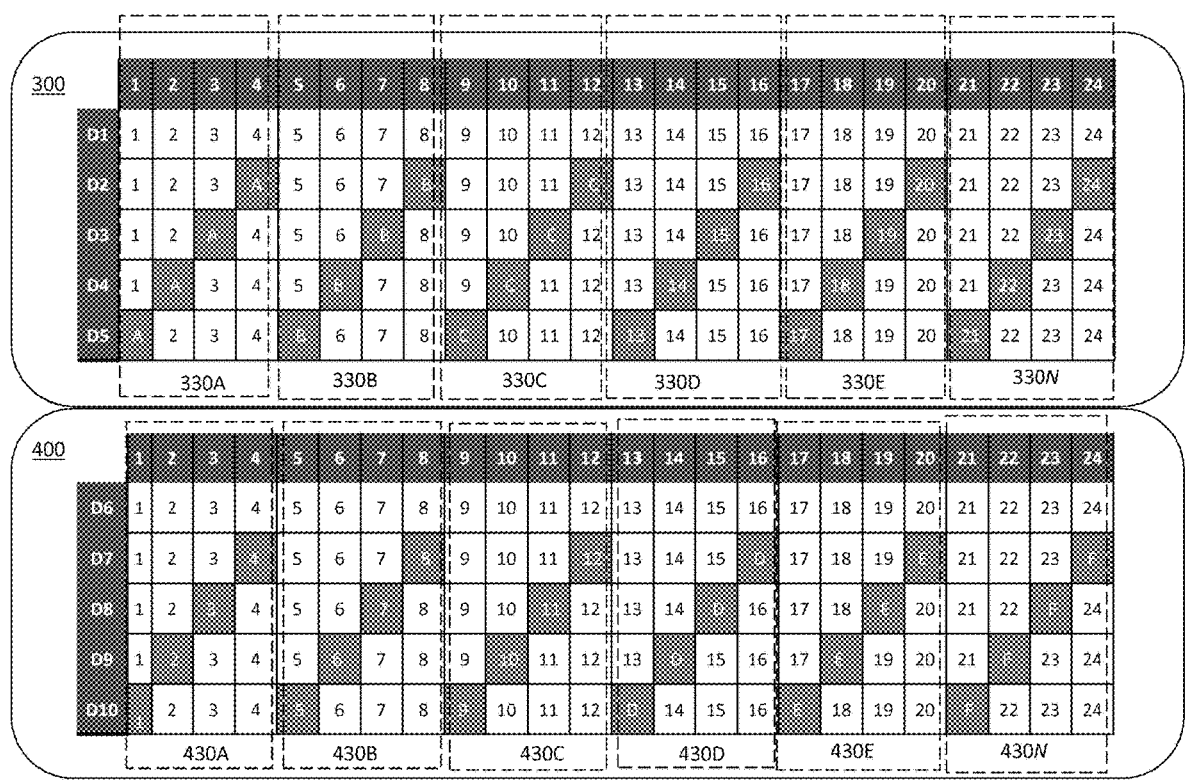
FIG. 4 is a block diagram of a storage matrix state related to a disk failure in accordance with example embodiments disclosed herein.

Regarding FIG. 4, the storage array 105 can expand to include storage cluster 300 and storage cluster 400. In such circumstances, the manager 215 can redistribute spare assignments such that each of the clusters 300, 400 include an equal number of spare partitions. In the example, illustrated, the manager 215 selects three (3) distinct submatrices (e.g., submatrices 330D-N and 430A-C) from each of the clusters 300, 400 to include spare partitions. Further, the manager 215 can repurpose the partitions from submatrices 330A-C of FIG. 3 for data storage. In other embodiments, the manager 215 could have first established the cluster 400 and the array 105 may have expanded to include the cluster 300. In this scenario, the manager 215 can redistribute spare assignments originally allocated to the submatrices 430D-N to submatrices 330D-N. Further, the manager 215 can repurpose the partitions defined by the submatrices 430D-N for data storage and provision the partitions defined by the submatrices 330A-C for data storage.

FIG. 5 illustrates a method per one or more embodiments of this disclosure. For simplicity of explanation, FIG. 5 depicts and describes the method as a series of acts. However, acts per this disclosure can occur in various orders and/or concurrently, and with other acts not presented and described herein. Furthermore, not all illustrated acts may be required to implement the method in accordance with the disclosed subject matter.

Regarding FIG. 5, a method 500 can be executed by, e.g., the disk controller 110. The method 500, at 505, can include determining a storage reserve capacity allocated for recovering at least one storage device of a storage array. Based on the storage reserve capacity, the method 500, at 510, can also include adaptively assigning zero or more storage portions from each storage device of at least one storage cluster for disk recovery. The at least one storage cluster can include a set of storage devices. At 515, the method 500 can include recovering the failing and/or failed disk using the assigned storage portions in response to detecting a failing and/or failed disk.

The method 500 can be performed according to any of the embodiments and/or techniques described by this disclosure, known to those skilled in the art, and/or yet to be known to those skilled in the art.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. A method comprising:
    determining a storage reserve capacity allocated for recovering at least one storage device of a plurality of storage devices in a storage cluster corresponding to a storage array;
    based on the storage reserve capacity, adaptively assigning zero or more storage portions from each storage device in a subset of the plurality of storage devices in the storage cluster for disk recovery, wherein assigning the portions includes:
        assigning at most one portion from each storage device in the subset of the plurality of storage devices as a spare for disk recovery, wherein the at most one portion is assigned based on a spare distribution pattern corresponding to a logical matrix representation of the storage cluster,
        allowing at least one storage device of the plurality of storage devices to remain free from having any portions assigned as disk recovery spares, and
        in response to expanding the storage cluster to include another storage cluster, redistributing spares for disk recovery such that the storage cluster and the other storage cluster include an equal number of spare partitions; and
    in response to detecting a failing and/or failed disk, recovering the failing and/or failed disk using the assigned storage portions.

2. The method of claim 1 further comprising:
    adaptively assigning the zero or more storage portions by using a successive redistribution and assignment technique.

3. The method of claim 1 further comprising:
    subdividing each storage device into a plurality of partitions, wherein the partitions are equal-sized;
    establishing at least one redundant array of independent disks (RAID) with a width (W) corresponding to RAID data (D) and parity (P) members; and
    establishing the partitions amount based on a multiple of the RAID width.

4. The method of claim 3 further comprising:
    establishing the at least one storage cluster based on the RAID width and the partitions amount.

5. The method of claim 4 further comprising:
    establishing at least one storage matrix defined by a number of storage devices and the partitions amount, wherein the number of storage devices corresponds to W+1, wherein the storage cluster corresponds to the at least one storage matrix.

6. The method of claim 5 further comprising:
    establishing a set of storage submatrices within the storage cluster, wherein each sub-matrix is defined by the number of storage devices and a partition sub-matrix amount corresponding to the RAID width.

7. The method of claim 6 further comprising:
    provisioning at least one RAID group from zero or more partitions defined by each sub-matrix, wherein the at least one RAID group's storage capacity corresponds to the storage reserve capacity.

8. The method of claim 7 further comprising:
    provisioning each RAID group using an adaptive successive redistribution and assignment technique (adaptive technique), wherein the adaptive technique includes selecting at most one storage device's partition in each storage sub-matrix; and
    establishing an amount of RAID groups based on a maximum RAID group capacity and the allocated storage reserve capacity.

9. The method of claim 8 further comprising:
    determining a storage cluster amount; and
    based on the storage cluster amount, provisioning each cluster with an equal amount of RAID groups.

10. The method of claim 9 further comprising:
    exclusively configuring each RAID group's partitions for disk recovery.

11. An apparatus configured to a memory and at least one processor configured to:
    determine a storage reserve capacity allocated for recovering at least one storage device of a plurality of storage devices in a storage cluster corresponding to a storage array;
    based on the storage reserve capacity, adaptively assign zero or more storage portions from each storage device in a subset of the plurality of storage devices in the storage cluster for disk recovery, wherein assigning the portions includes:
        assigning at most one portion from each storage device in the subset of the plurality of storage devices as a spare for disk recovery, wherein the at most one portion is assigned based on a spare distribution pattern corresponding to a logical matrix representation of the storage cluster,
        allowing at least one storage device of the plurality of storage devices to remain free from having any portions assigned as disk recovery spares, and
        in response to expanding the storage cluster to include another storage cluster, redistributing spares for disk recovery such that the storage cluster and the other storage cluster include an equal number of spare partitions; and
    in response to detecting a failing and/or failed disk, recover the failing and/or failed disk using the assigned storage portions.

12. The apparatus of claim 11 further configured to:
    adaptively assign the zero or more storage portions by using a successive redistribution and assignment technique.

13. The apparatus of claim 11 further configured to:
    subdivide each storage device into a plurality of partitions, wherein the partitions are equal-sized;
    establish at least one redundant array of independent disks (RAID) with a width (W) corresponding to RAID data (D) and parity (P) members; and establish a partitions amount based on a multiple of the RAID width.

14. The apparatus of claim 13 further configured to:
establish the at least one storage cluster based on the RAID width and the partitions amount.

15. The apparatus of claim 14 further configured to:
establish at least one storage matrix defined by a number of storage devices and the partitions amount, wherein the number of storage devices corresponds to W+1, wherein the storage cluster corresponds to the at least one storage matrix.

16. The apparatus of claim 15 further configured to:
establish a set of storage submatrices within the storage cluster, wherein each sub-matrix is defined by the number of storage devices and a partition sub-matrix amount corresponding to the RAID width.

17. The apparatus of claim 16 further configured to:
provision at least one RAID group from zero or more partitions defined by each sub-matrix, wherein the at least one RAID group's storage capacity corresponds to the storage reserve capacity.

18. The apparatus of claim 17 further configured to:
provision each RAID group using an adaptive successive redistribution and assignment technique (adaptive technique), wherein the adaptive technique includes selecting at most one storage device's partition in each storage sub-matrix; and
establish an amount of RAID groups based on a maximum RAID group capacity and the allocated storage reserve capacity.

19. The apparatus of claim 18 further configured to:
determine a storage cluster amount; and
based on the storage cluster amount, provision each cluster with an equal amount of RAID groups.

20. The apparatus of claim 19 further configured to:
exclusively configure each RAID group's partitions for disk recovery.

* * * * *